United States Patent [19]

Eguchi

[11] Patent Number: 5,474,680

[45] Date of Patent: * Dec. 12, 1995

[54] POLYSULFONE POROUS HOLLOW FIBER

[75] Inventor: Tamiyuki Eguchi, Kobe, Japan

[73] Assignee: Kanegafuchi Kagaku Kogyo Kabushiki Kaisha, Osaka, Japan

[*] Notice: The portion of the term of this patent subsequent to Aug. 3, 2010, has been disclaimed.

[21] Appl. No.: 46,724

[22] Filed: Apr. 16, 1993

Related U.S. Application Data

[63] Continuation of Ser. No. 978,379, Nov. 18, 1992, Pat. No. 5,232,597.

[30] Foreign Application Priority Data

Nov. 19, 1991 [JP] Japan .................................. 3-331494

[51] Int. Cl.⁶ .................................................. B01D 69/08
[52] U.S. Cl. .................................. 210/500.23; 210/500.41
[58] Field of Search .................... 210/500.23; 521/61; 210/500.41, 490

[56] References Cited

U.S. PATENT DOCUMENTS

| | | | |
|---|---|---|---|
| 4,612,119 | 9/1986 | Eguchi | 210/500.23 |
| 4,720,343 | 1/1988 | Walch et al. | 210/500.28 |
| 4,906,375 | 3/1990 | Heilmann | 210/500.23 |
| 4,940,542 | 7/1990 | Simizu et al. | 210/34.89 X |
| 5,026,479 | 6/1991 | Bikson et al. | 210/500.23 X |
| 5,085,676 | 2/1992 | Ekiner et al. | 210/500.23 |
| 5,104,535 | 4/1992 | Cote et al. | 210/500.23 |
| 5,130,342 | 7/1992 | McAllister et al. | 521/61 |
| 5,232,597 | 8/1993 | Eguchi | 210/500.41 X |

FOREIGN PATENT DOCUMENTS

| | | |
|---|---|---|
| 0086365 | 8/1983 | European Pat. Off. |
| 0121911 | 10/1984 | European Pat. Off. |
| 0168783 | 1/1986 | European Pat. Off. |
| 0294737 | 12/1988 | European Pat. Off. |
| 2100181 | 12/1982 | United Kingdom |

*Primary Examiner*—Frank Spear
*Attorney, Agent, or Firm*—Armstrong, Westerman, Hattori, McLeland & Naughton

[57] ABSTRACT

A porous hollow fiber of polysulfone suitable for use in filtration such as microfiltration and having a prolonged life, the hollow fiber having an inner surface with a network structure such that approximately circular openings having a minor axial length of 0.1 to 10 μm are present in proximity to each other at intervals of not more than the average minor axial length of the openings, thus providing a surface fraction of openings of 50 to 90% and/or an outer surface of a structure such that the outer surface region has undergone fibrillation to a high degree to form fibrils oriented in the fiber axial direction at intervals of 0.2 to 3 μm, thus providing a surface fraction of openings of at least 50%. The hollow fiber is prepared by a process characterized in that a polymer substance having an extremely high molecular weight such as polyethylene glycol and polyvinyl pyrrolidone is added to the spinning solution of polysulfone, thereby improving the spinnability.

2 Claims, 4 Drawing Sheets

POLYSULFONE POROUS HOLLOW FIBER

This is a continuation of application Ser. No. 07/978,379, filed Nov. 18, 1992 now U.S. Pat. No. 5,232,597.

BACKGROUND OF THE INVENTION

The present invention relates to a porous hollow fiber of a polysulfone suitable for use in filtration, e.g. microfiltration. More particularly, the invention relates to a polysulfone porous hollow fiber which has a relatively large pore size, and the surface fraction of openings on the inner or outer surface of which is extremely increased by providing the inner surface with a structure such that approximately circular open pores (openings) are formed at intervals not exceeding the average diameter of the openings or by fibrillation of the outer surface portion to a high degree, whereby the clogging is prevented and the filtration life is prolonged.

Polysulfone porous hollow fibers have been appreciated to have excellent heat resistance and chemical resistance and have been widely used for industrial microfiltration, ultrafiltration and other purposes.

Conventional polysulfone porous hollow fibers have been prepared by so-called dry-wet spinning method which basically comprises extruding a homogeneous or approximately homogeneous raw spinning solution of polysulfone together with a core liquid into the air through a double ring nozzle and then immersing in a coagulation liquid.

As the dry-wet spinning method, there are proposed many methods wherein the composition of the polysulfone solution, the composition of the core liquid, the composition of the coagulation liquid and the spinning conditions such as temperature and spinning speed are altered and combined. For example, as the polysulfone solution, there is used a solution of polysulfone dissolved in a mixed solvent of an aprotic good solvent such as dimethylformamide, dimethylacetoamide or N-methyl-2-pyrrolidone and a non-solvent such as propylene glycol, which causes a phase separation at a temperature below room temperature (as disclosed in Japanese Patent Publication Kokai No. 60-222112), a polysulfone solution to which polyethylene glycol having a molecular weight of 400 to 20,000 is added as an additive (as disclosed in Japanese Patent Publication Kokai Nos. 57-35906 and 58-Japanese 114702 ), or a polysulfone solution to which polyvinyl pyrrolidone having a molecular weight of 10,000 to 450,000 is added as an additive (as disclosed in Japanese Patent Publication Kokai Nos. 61-93801, 61-238306 and 63-97205). Hollow fibers having openings with a diameter on sub-micrometer order are obtained by extruding such a spinning solution with a core liquid, e.g. an aqueous solution of the above-mentioned good solvent consisting, a mixed solvent of a good solvent and a non-solvent or mixtures of these core liquids and the above-mentioned additives such as polyethylene glycol and polyvinyl pyrrolidone, through a double ring nozzle at a temperature such that the spinning solution is kept homogeneous or approximately homogeneous, running the extrudate several centimeters to several tens of centimeters in the air and coagulating it in water or an aqueous solution of a good solvent.

In general, clogging of filtration membranes is considered to result from the mechanism that impermeable substances are deposited on the surface, and the mechanism that impermeable substances are caught and accumulate inside the filter medium. In the former case, as would be easily understood, the larger the surface fraction of openings on the surface of the filtration membrane, the harder the clogging occurs and the longer the life. In the latter case, too, it is apparent that a larger surface fraction of openings on the membrane surface is desirable so long as impermeable substances have a uniform size and the life with respect to clogging does not depend on only the amount of impermeable caught and accumulated inside the membrane. Evaluating conventional hollow fibers produced by the above-mentioned method from such a point of view, the inner surface has a surface fraction of openings of about 10–40% and openings of circular shape or irregular shapes are formed, and the outer surface has a surface fraction of openings of at most several tens of % and openings of circular or irregular shapes are formed. It has been pointed out that conventional hollow S fibers are insufficient in life in both the uses where the filtration is conducted in the direction toward the outer surface of the hollow fiber from the inner surface and the uses where the filtration is conducted in the direction toward the inner surface of the hollow fiber from the outer surface.

It is expected that the clogging is reduced by increasing the surface fraction of openings on the inner and outer surfaces of the hollow fiber, thus the life could be prolonged. However, hollow fibers having both a sufficiently high surface fraction of openings and a sufficiently high strength cannot be obtained by a method according to conventional methods. For example, even if a known spinning solution is spun using a core liquid having a lower coagulating function, an inner surface having a structure which is composed of irregular openings and continuously distributed spherical polymer portion, is formed. The surface fraction of openings does not exceed 50%.

It is an object of the present invention to provide a polysulfone porous hollow fiber having an extremely prolonged life with respect to clogging of pores of hollow fiber as compared with conventional polysulfone hollow fibers.

Another object of the present invention is to provide a polysulfone hollow fiber which has a large surface fraction of openings and can be used in filtration such as microfiltration or ultrafiltration for a long term.

These and other objects of the present invention will become apparent from the description hereinafter.

SUMMARY OF THE INVENTION

Investigation has been made by the present inventor in order to increase the opening percentage of the inner and outer surfaces of a polysulfone hollow fiber.

In order to further increase the surface fraction of openings in the inner surface, it is necessary to form the inner surface into a network structure that the wall surface-constituting portion (framework) continues two-dimensionally in the face direction and moreover the proportion of the area occupied by the framework region is small. In order to form such a structure, there must be formed an island-sea structure where a polymer-concentrated phase in the spinning solution forms a sea continuous two-dimensionally in the face direction and a polymer-dilute phase forms a large number of islands, when the spinning solution causes a phase separation by contact with the core liquid. For achieving this structure, it is necessary that polymer molecules in the concentrated phase have a strong attractive interaction to each other and the concentrated phase keeps the continuity until coagulation occurs. However, the molecular weight of polysulfone synthesized by condensation polymerization is too small to have such an interaction. Even if such a continuous state could be achieved by specially raising the polymer concentration, the number of islands of the dilute phase which form pores and openings is decreased, thus the surface fraction of openings does not increase. It is considered that if the substances whose molecular weight is sufficiently high enough to retain the interaction and which are soluble in solvents for polysulfone to form a homogeneous or approximately homogeneous solution, are present, these high molecular weight substances can maintain the continuous state while causing polysulfone to exist in proximity to them in the concentrated phase until the polysulfone coagulates, thus revealing the network structure mentioned above. Further, if these high molecular weight substances could be removed by cleaning, a hollow fiber of polysulfone having an inner surface of the above-mentioned network structure would be formed.

With respect to the outer surface of the hollow fiber, it is considered that in conventional methods openings are formed on the outer surface by occurrence of S phase separation of the spinning solution during the dry step. In the conventional methods, the surface fraction of openings on the outer surface is at most several tens of % since the dry step is left to follow its own thermodynamic course without applying a special procedure. It is considered that the surface fraction of openings on the outer surface could be increased by applying any procedure such as drawing without leaving the stage from occurrence of phase separation to coagulation to follow its own thermodynamic course. However, according to conventional methods, hollow fibers are cut off if such a procedure is applied to the above-mentioned entire stage from the moment immediately after extruding the spinning solution through a nozzle, since the spinning solution of polysulfone is poor in spinnability. In particular, after the complete coagulation, application of a dynamical procedure such as drawing invariably cut off the hollow fiber before the surface fraction of openings is changed by the dynamical procedure. Therefore, it is expected that if a drawing procedure could be applied immediately after occurrence of phase separation by using a spinning solution formulated to have an increased drawing ability, it would be possible to further increase the surface fraction of openings on the outer surface of the hollow fiber. The spinnability of a spinning solution is increased with increasing the molecular weight of a polymer dissolved therein. However, it is difficult to increase the molecular weight of polysulfone as stated above, and in practice, the degree of polymerization of commercially available polysulfones is low. However, it is possible to improve the spinnability of the spinning solution by adding thereto other polymers having a high molecular weight which can be dissolved homogeneously with polysulfone.

The present inventor has continued investigation in order to find suitable high molecular weight substances under the above-mentioned consideration. It has now been found that a polysulfone hollow fiber the inner surface of which has a network structure having a large surface fraction of openings is obtained by adding to the spinning solution a high molecular weight polyethylene glycol or a high molecular weight polyvinyl pyrrolidone which imparts specific solution characteristics to the spinning solution and which has not been used in any conventional methods. It has been also found that when the above proposed spinning solution is extruded and subjected to drawing to a high degree immediately after the phase separation which occurs during the stage between the dry step and the moment just after entering into the coagulation liquid, the outer surface undergoes a high degree of fibrillation, thus producing a polysulfone hollow fiber having an extremely increased surface fraction of openings on its outer surface as compared with conventional hollow fibers.

In accordance with the present invention, there is provided a porous hollow fiber of polysulfone, the inner surface of which has a structure such that approximately circular openings having a minor axial length of 0.1 to 10 μm are present in the inner surface at intervals of not more than the average minor axial length of the openings.

There is also provided a porous hollow fiber of polysulfone, the outer surface of which has a structure which is in the state of a high degree of fibrillation.

The hollow fiber according to the present invention may have both above-mentioned inner and outer surface structures.

DETAILED DESCRIPTION

Figure 1:
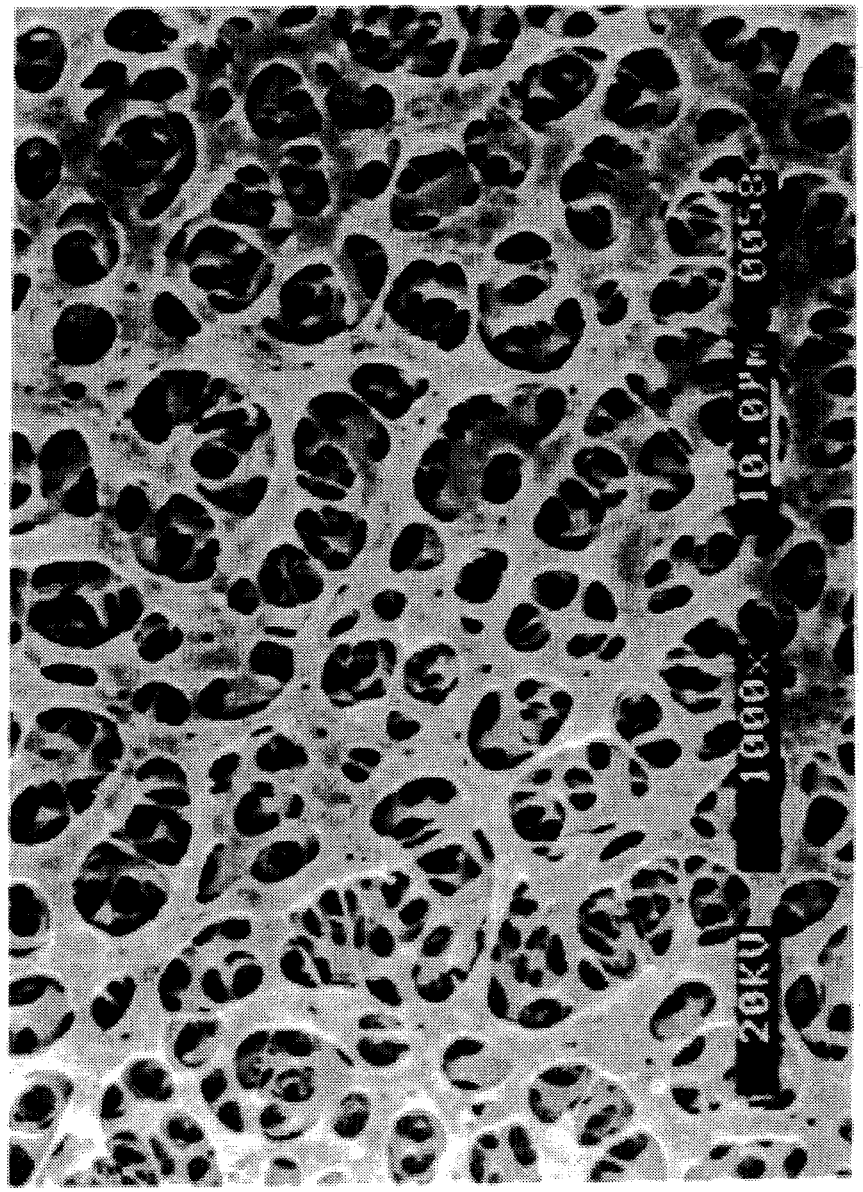
FIG. 1 is an electron microphotograph of the inner surface of a hollow fiber obtained in Example 1 described after.

The hollow fiber of the present invention useful as a filter medium is made from a polysulfone. Any of known polysulfone resins can be used in the present invention. Representative examples of the polysulfone which constitutes the hollow fiber of the present invention are a polysulfone having a repeating unit of the formula (1):

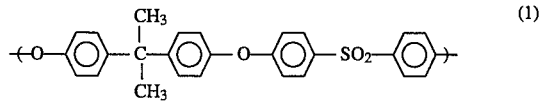

and a polysulfone having a repeating unit of the formula (2):

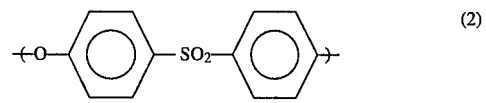

The polysulfone (1) is preferred, since it provides a hollow fiber having a particularly large elongation at breaking.

The hollow fiber of the present invention can be designed to have optimum inner diameter depending on average diameter of openings or pores, effective length, liquids to be tinkered and the like. The inner diameter of the hollow fiber is usually from 200 to 2,000 μm. The wall thickness of the hollow fiber is usually selected from 30 to 300 μm from the viewpoints of strength and resistance to pressure.

The hollow fiber of the present invention has an inner surface with a structure (hereinafter referred to as specific inner surface structure) such that approximately circular openings having a minor axial length of 0.1 to 10 μm are present in close proximity to each other on the inner surface at intervals of not more than the average minor axial length of the openings and may have an outer surface with any structure, or the hollow fiber has an outer surface with a structure (hereinafter referred to as specific outer surface structure) which is in the state of a high degree of fibrillation and may have an inner surface with any structure. Also, the hollow fiber of the present invention can have both the specific inner surface structure and the specific outer surface structure. The hollow fiber having the specific inner surface structure according to the present invention is particularly useful for purposes where the filtration is conducted from the inner surface toward the outer surface. The hollow fiber having the specific outer surface structure according to the present invention is particularly useful for purposes where the filtration is conducted from the outer surface toward the inner surface. The hollow fiber having the specific inner and outer surface structures is useful for both purposes. The wall of the hollow fiber is porous, and the openings of pores on the inner surface communicate to the outer surface.

In case of the hollow fiber having the specific inner surface structure, since approximately circular openings having a minor axial length of 0.1 to 10 μm, especially 0.5 to 5 μm, are present in close proximity to each other in the inner surface at intervals of not more than the average minor axial length of the openings, the surface fraction of openings is much higher than that of conventional hollow fibers. In particular, the hollow fiber is not prone to clogging in uses where impermeable substances are easy to accumulate on the inner surface, thus the life is further prolonged.

The term "approximately circular opening" as used herein means an opening ( opening of a pore in the inner surface) having a major axis/minor axis ratio of not more than about 2/1. Such openings are present in close proximity to each other in the surface. In other words, the inner surface of the hollow fiber of the present invention has a network structure that a polysulfone framework extends two-dimensionally and continuously in the face direction to form the inner surface having openings and moreover the area occupied by the polysulfone framework region is small. Accordingly, the surface fraction of openings in the inner surface is from 50 to 90%, especially reaches up to 70 to 90%.

When the minor axial length of the approximately circular opening in the inner surface exceeds 10 μm, the strength of the hollow fiber is decreased. When the minor axial length is less than 0.1 μm, the velocity of water permeation is decreased. The spacing between adjacent approximately circular openings in the inner surface (in other words, the width of the polysulfone framework) is not more than the average minor axial length of the openings. From the viewpoint of balance between the surface fraction of openings and the fiber strength, it is preferable that the spacing at the narrowest portion is from 0.05 to 8 μm, especially from 0.1 to 5 μm.

The term "surface fraction of openings" as used herein means the proportion of the area of openings on the surface of the hollow fiber. The surface fraction of openings is determined by using an electron microphotograph of the surface of the hollow fiber. For example, it can be obtained by cutting the opening portion of the surface out of the electron microphotograph and representing it in terms of the weight fraction of the opening portion.

The structure or state of the outer surface of the hollow fiber having the specific inner surface structure is not particularly limited. In general, the average diameter of openings in the outer surface is from 0.1 to 5 μm, preferably 0.5 to 2 μm, and the surface fraction of openings is from 20 to 90%, preferably 50 to 90 %. The outer surface having the average opening size and the surface fraction of openings within the above ranges can be obtained by a process described after. The hollow fiber having the specific inner surface structure may of course have the specific outer surface structure as explained below in detail.

In case of the hollow fiber having the specific outer surface structure, since the outer surface has a structure that the outer surface region has undergone fibrillation to a high degree, the surface fraction of openings in the outer surface is extremely increased as compared with that of conventional hollow fibers. In particular, the hollow fiber is not prone to clogging in uses where impermeable substances tend to accumulate on the outer surface, thus the life is very prolonged.

The term "having undergone fibrillation to a high degree" or "being in the state of a high degree of fibrillation" as used herein means that the portion excepting the space portion or open portion in the outer surface of the hollow fiber is composed mainly of fibrils. Both ends of the fibril are in a porous lamella-like state, fibril a fibrous portion having a thickness of 0.1 to 0.5 μm and a length of 1 to 7 μm. The term "high degree" in fibrillation means that the area of the fibril region of the outer surface excepting the porous lamella-like region present at both ends of fibril is at least 50%, preferably at least 60%, of the entire outer surface. The porous lamella-like region is a portion having circular or elliptical fine openings, which is considered to be in a state prior to fibrillation and has not undergone fibrillation. It is preferable that the size of each porous lsmella-like region is from 1 to 5 μm². Most of the fibrils are oriented in the direction of the axis of the hollow fiber, and it is preferable that the spacing between the fibrils in the surface (which corresponds to the minor axial length of the opening in the outer surface) is from 0.2 to 3 μm.

The outer surface which has undergone fibrillation to a high degree has a high surface fraction of openings as explained above and, therefore, it is not prone to clogging. The surface fraction of openings of the outer surface is usually at least 50% especially from 70 to 90%.

The inner surface structure for the hollow fiber having the specific outer surface structure explained above is not particularly limited. The inner surface of this hollow fiber is usually one having an average diameter of openings from the ultrafiltration level to several micrometers, preferably from 0.1 to 5 μm, and having a surface fraction of openings of 20 to 90%, preferably 50 to 90%. The hollow fiber having the specific outer surface structure can of course have the specific inner surface structure mentioned before.

It is desirable that the section of the hollow fiber of the present invention has an isotropic network structure in the great part of the sectional region in order to avoid the anisotropy in strength, and the diameter of the pores is from about 0.1 to about 0.6 μm. It is also desirable that the section has a structure such that in the neighborhood of each of the inner and outer surfaces, the pore size substantially continuously changes toward the size of openings in each of the inner and outer surfaces. When the large portion of the section has an isotropic network structure, the tensile strength, elongation and pressure resistance of the hollow fiber are equal to or higher than those of conventional hollow fibers even if the surface fraction of openings in the inner surface is very large. Also, in case that the hollow fiber has the specific outer surface structure, it is preferable that the fibril structure in the outer surface is present in the outer surface region corresponding to 10% of the wall thickness, since it is possible to provide the hollow fiber with strength against tension and pressure which is equal to or higher than those of conventional hollow fibers despite the fact that the substantial surface fraction of openings is much higher. Also, the average diameter of pores present in the inside region in section of the hollow fiber may continuously increase or decrease in the direction from the outer surface toward the inner surface.

The velocity of water permeation of the hollow fiber according to the present invention is from 1,000 to 30,000 $l/m^2hr.kg/cm^2$, especially from 3,000 to 20,000 $l/m^2.hr.kg/cm^2$. The strength of the hollow fiber is measured, for example, by a universal tension tester (trade mark "Autograph AG-200", product of Shimadzu Corporation). The hollow fiber of the present invention has a maximum tensile strength of 50 to 100 $kg/cm^2$, a maximum elongation of 30 to 100%, preferably 50 to 100%. The pressure resisting strength that the hollow fiber is not collapsed by a pressure from 2 to 10 $kg/cm^2$, preferably 4 to 8 $kg/cm^2$.

The hollow fibers of the present invention having the features as mentioned above are useful particularly for, when they have the specific inner surface structure, general industrial microfiltration and filtration of blood where liquids flow from the inside to the outside of the hollow fiber, and are useful particularly for, when they have the specific outer surface structure, general industrial microfiltration and a water purifier where liquids flow from the outside to the inside of the hollow fiber.

The hollow fibers having the specific inner surface structure according to the present invention are prepared by a process mentioned below.

The hollow fibers having an inner structure such that a large number of openings are formed in the surface in close proximity to each other at intervals of not more than the average minor axial length of the openings and the surface fraction of openings in the inner wall surface is as very high as 50 to 90%, are obtained by adding a small amount of a high molecular weight substance to a solution of polysulfone to adjust the viscosity to 5,000 to 50,000 cps, extruding the thus prepared spinning solution which has a normal stress effect (Weissenberg effect), into the air through a double ring nozzle together with a core liquid which has a small coagulation action, and then introducing the extrudate into a coagulation liquid. When the viscosity of the spinning solution is less than 5,000 cps, no desirable Weissenberg effect is obtained, and when the viscosity is more than 50,000 cps, the spinning may become unstable.

A large number of high molecular weight substances are applicable to the preparation of the spinning solution so long as they can impart a sufficiently high viscosity, but it is desirable that these substances remain as least as possible in the finally obtained hollow fiber in order to maintain excellent characteristics of polysulfone. Accordingly, high molecular weight substances soluble in the coagulation liquid or water which is the most economical cleaning liquid, are preferable. Representative examples of such high molecular weight substances to be added to the spinning solution are, for instance, polyethylene glycol and polyvinyl pyrrolidone. In conventional methods of the preparation of polysulfone hollow fibers, it is proposed to use polyethylene glycol or polyvinyl pyrrolidone, but the molecular weight of these polymers used in the conventional methods is too small to give a spinning solution having a high viscosity, thus hollow fibers as intended by the present invention are not obtained.

It is preferable that polyethylene glycol used in the present invention has a number average molecular weight of 150,000 to 2000,000, especially 200,000 to 500,000. When the molecular weight is less than 150,000, a large mount of polyethylene glycol must be added for providing the normal stress effect to the spinning solution. The inner surface of the hollow fiber prepared from such a spinning solution has a network structure having a very thin framework, thus the elongation and strength of the hollow fiber are decreased. On the other hand, when the molecular weight is more than 2000,000, the solubility of polyethylene glycol is small, the obtained hollow fiber has a cellular structure in section thereof, but not a network structure, and the filtration velocity is decreased. Similarly, it is preferable that polyvinyl pyrrolidone has a number average molecular weight of at least about 500,000, especially 700,000 to 1000,000. In conventional methods, even if mere modification to simply increase the amount of polyethylene glycol or polyvinyl pyrrolidone is applied, hollow fibers having low elongation and low strength are only obtained.

Solvents used for preparing the spinning solution are solvents common to polysulfone and polyethylene glycol or polyvinyl pyrrolidone. Preferable solvents are, for instance, dimethylsulfoxide, dimethylformamide, dimethylacetoamide, N-methyl-2-pyrrolidone, and mixtures thereof. Mixed solvents consisting of these good solvents and a small amount of water or a low molecular weight polyhydric alcohol such as propylene glycol can also be used as the solvent for the spinning solution. N-methyl-2-pyrrolidone is particularly preferred as the above-mentioned good solvent, since it provides a definite normal stress effect when the high molecular weight additive is dissolved.

The concentration of polysulfone in the spinning solution is from 14 to 30% by weight, preferably 15 to 25% by weight. When the concentration of polysulfone is less than 14% by weight, the strength of the obtained hollow fiber is low, and when the concentration is more than 30% by weight, the viscosity becomes too large and the spinning is difficult.

The concentration of the high molecular weight additive such as polyethylene glycol in the spinning solution is preferably from 1 to 15% by weight, especially 2 to 10% by weight, from the viewpoint of high spinnability and normal stress effect. When the concentration of the high molecular weight additive is less than 1% by weight, the filtration velocity of the obtained hollow fiber is low, and when the concentration is more than 15% by weight, the obtained hollow fiber is poor in elongation and strength.

The spinning solution at the time when it is discharged from a nozzle is required to be maintained at a temperature which is close to the phase separation temperature and at which the spinning solution is in the state of a homogeneous or approximately homogeneous solution. This temperature is usually from 40° to 80° C., preferably from 50° to 60° C. When the temperature of the spinning solution discharged is less than 40° C., the viscosity may exceed 50,000 cps, and when the temperature is more than 80° C., the viscosity may not reach 5,000 cps.

The core liquid discharged from a double ring nozzle together with the spinning solution is a mixture of a good solvent for polysulfone and a non-solvent for polysulfone.

The structure of the inner surface is also greatly influenced by the composition of the core liquid. That is to say, the size and number of openings in the inner surface increase with decreasing the coagulation action of the core liquid to the spinning solution, thus the inner surface widely changes as follows: From the state where the circular openings whose surroundings are smooth are scattered, to the state where the number of openings so that a pore is adjacent to other pores, and with further increase of the number of pores, the inner surface appearance changes to a network form where pores are two-dimensionally in contact with each other.

The temperature of the core liquid is from 20° to 80° C., preferably 30° to 60° C.

When the length of the dry step (length of a dry space into which the spinning solution is extruded) is made long, or when a non-solvent is added to the spinning solution to make it easy to coagulate, the size and number of openings in the outer surface are increased.

Further, if the extruded fiber is drawn several times at the stage between the dry step and the moment just after the fiber enters into the coagulation liquid, the specific outer surface structure mentioned above is formed.

A great part of the section of the hollow fiber prepared by the above-mentioned process has an approximately isotropic network structure. The average size of pores in the section of the hollow fiber almost continuously increases or decreases, in regions near the inner and outer surfaces, toward the size of openings present in each of the inner and outer surfaces.

From the viewpoint of productivity, it is desirable that the velocity of spinning is high as much as possible. The spinning velocity is usually from 40 to 100 m/minute. When the velocity is more than 100 m/minute, cutting off of the hollow fiber may occur due to resistance of the coagulation liquid.

The coagulation liquid is selected mainly from the viewpoint of cleaning effect of the hollow fiber. As easily understood, hot water is preferable as the coagulation liquid. Hot water having a temperature of 50° to 70° C. is particularly preferred from the operational point of view.

The process for the preparation of the hollow fiber having the specific outer surface structure according to the present invention is explained below.

Fibrillation of the outer surface of the hollow fiber to a high degree can be achieved by drawing the fiber to a high degree at the stage between the dry step and the moment just after the fiber enters into the coagulation liquid. For achieving the purpose, it is necessary to select a spinning solution having a high spinnability. In general, the spinnability of a solution of a polymer increases with increase of the molecular weight of the polymer. Therefore, the spinnability of a solution of polysulfone can be raised by adding other high molecular substances having a high molecular weight (hereinafter referred to as polymer additive) which can be dissolved in a common solvent with polysulfone to form a homogeneous or approximately homogeneous solution. The viscosity of the spinning solution is increased by the addition of the polymer additive, but it is preferable that the viscosity of the spinning solution for preparing the the hollow fiber having the specific outer surface structure is adjusted within the range of about 5,000 to about 50,000 cps, especially about 7,000 to about 30,000 cps. When the viscosity is less than 5,000 cps, the spinnability is low, and when the viscosity is more than 50,000 cps, a stable spinning may be difficult. The thus prepared spinning solution has a so-called normal stress effect such that the extruded spinning solution expands in its radial direction when extruded from the nozzle and, therefore, the drawing effect is accelerated.

Like in the case of the production of the hollow fiber having the specific inner surface structure, materials which are easily soluble in water used as the coagulation liquid or as the cleaning liquid and which remain in the end product as least as possible are preferred as the polymer additive to be added to the polysulfone solution, and the same materials as those used in the production of the hollow fiber having the specific inner surface structure are applicable to the production of the hollow fiber having the specific outer surface structure. That is to say, as the polymer additive there are mentioned polyethylene glycol having a number average molecular weight of 150,000 to 2000,000, preferably 200,000 to 500,000, and polyvinyl pyrrolidone having a number average molecular weight of at least about 500,000, preferably 700,000 to 1000,000.

The solvents for spinning solution and the concentrations of polysulfone and polymer additive in the spinning solution in the production of the hollow fiber having the specific outer surface structure are selected in the same manner as in the production of the hollow fiber having the specific inner surface structure.

The drawing of the spinning solution extruded from the nozzle must be conducted at the stage between the dry step and the moment just after entering into the coagulation liquid while the coagulation has not completely taken place. Moreover, if phase separation has not occurred at least in the outer surface region of the extruded spinning solution at this stage, a fibril structure cannot be formed in the outer surface. Therefore, the spinning solution is required to have a composition capable of causing a phase separation at a certain temperature, and moreover it is necessary to maintain the spinning solution located in the nozzle at a temperature which is close to the phase separation-occurring temperature but can keep the spinning solution in the state of a homogeneous or approximately homogeneous solution. This temperature of the spinning solution at the nozzle is from 40° to 80° C., preferably 50° to 60° C., like in the case of producing the hollow fiber having the specific inner surface structure.

The core liquids discharged from the double ring nozzle together with the spinning solution in the production of the hollow fiber having the specific inner surface structure are also applicable to the production of the hollow fiber having the specific outer surface structure. That is to say, mixtures of good solvents for polysulfone and non-solvents for polysulfone are used as the core liquid.

The inner diameter of a ring-like discharge port of the double ring nozzle for extruding the spinning solution is preferably from 1.2 to 2.0 times the inner diameter of the finally obtained hollow fiber. When the inner diameter of the ring nozzle is less than 1.2 times, the hollow fiber having the desired inner diameter is lacking in draw ratio and, therefore, there is a possibility that fibrils are not sufficiently formed in the outer surface of the hollow fiber. When the inner diameter of the ring nozzle is more than 2.0 times, the hollow fiber may be cut off in the drawing step because of too large draw ratio. The width of the ring (spacing of slit of the ring nozzle) is preferably from 1.5 to 3.5 times the wall thickness of the final hollow fiber. When the width of the ring is outside the above range, a problem that the discharged liquid is not stabilized may be encountered. Since the spinning solution sent out of the nozzle expands by normal stress effect, the substantial draw ratio reaches 2 to 5 times the nozzle size. The draw ratio is represented by the ratio of the outer diameter of the extruded spinning solution, which has expanded to the maximum in the vicinity of the discharging port of the nozzle, to the outer diameter of the final hollow fiber.

It is preferable that the length of the dry step is relatively long in providing the drawing effect. The length of the dry step is usually from 5 to 30 cm, preferably from 10 to 20 cm. The dry step exceeding 30 cm is unnecessary.

The spinning velocity is the same as in the case of the hollow fiber having the specific inner surface structure, i.e. usually from 40 to 100 m/minute.

The spinning solution extruded from the nozzle is subjected to drawing at the location between the dry step and the position just after entering into the coagulation liquid. From the fact that the hollow fibers having an outer surface which has undergone fibrillation to a high degree are obtained even if a coagulation liquid having a high coagulating action such as water is used, it is considered that the drawing effect is almost provided to the fiber in the drying step. Therefore, the coagulation liquid is selected mainly from the viewpoint of cleaning effect, and hot water is preferred as easily understood. Hot water of 50° to 70° C. is more preferable from the operational point of view.

The present invention is more specifically described and explained by means of the following Examples, in which all % and parts are by weight unless otherwise noted.

EXAMPLE 1

In a mixed solvent of 66 parts of N-methyl-2-pyrrolidone and 9 parts of propylene glycol were dissolved 5 parts of polyethylene glycol having a number average molecular weight of 300,000 and 20 parts of a polysulfone (commercially available under the trade mark "Udel Polysulfone P-3500" made by Amoco). The thus prepared spinning solution had a lower critical solubility temperature of 62° C. and a viscosity of 24,000 cps at 60° C.

A mixture of 70 parts of N-methyl-2-pyrrolidone and 30 parts of propylene glycol was used as the core liquid.

Through a double ring nozzle having a ring-like discharge port with an inner diameter of 0.8 mm and an outer diameter of 1.3 mm and a core liquid discharge port with a diameter of 0.5 mm, the spinning solution maintained at 60° C. was extruded out of the ring-like discharge port at a rate of 25 g/minute, while extruding the core liquid at a rate of 10 g/minute. The extruded spinning solution was introduced into 60° C. hot water located below the nozzle at a distance of 15 cm to coagulate the spinning solution, and was wound up at a spinning velocity of 50 m/minute to give a hollow fiber having an inner diameter of 570 µm and an outer diameter of 870 µm. The spinning solution extruded from the nozzle expanded to a thickness of about 3 mm just below the nozzle, thus the draw ratio was about 3.5.

Figure 2:
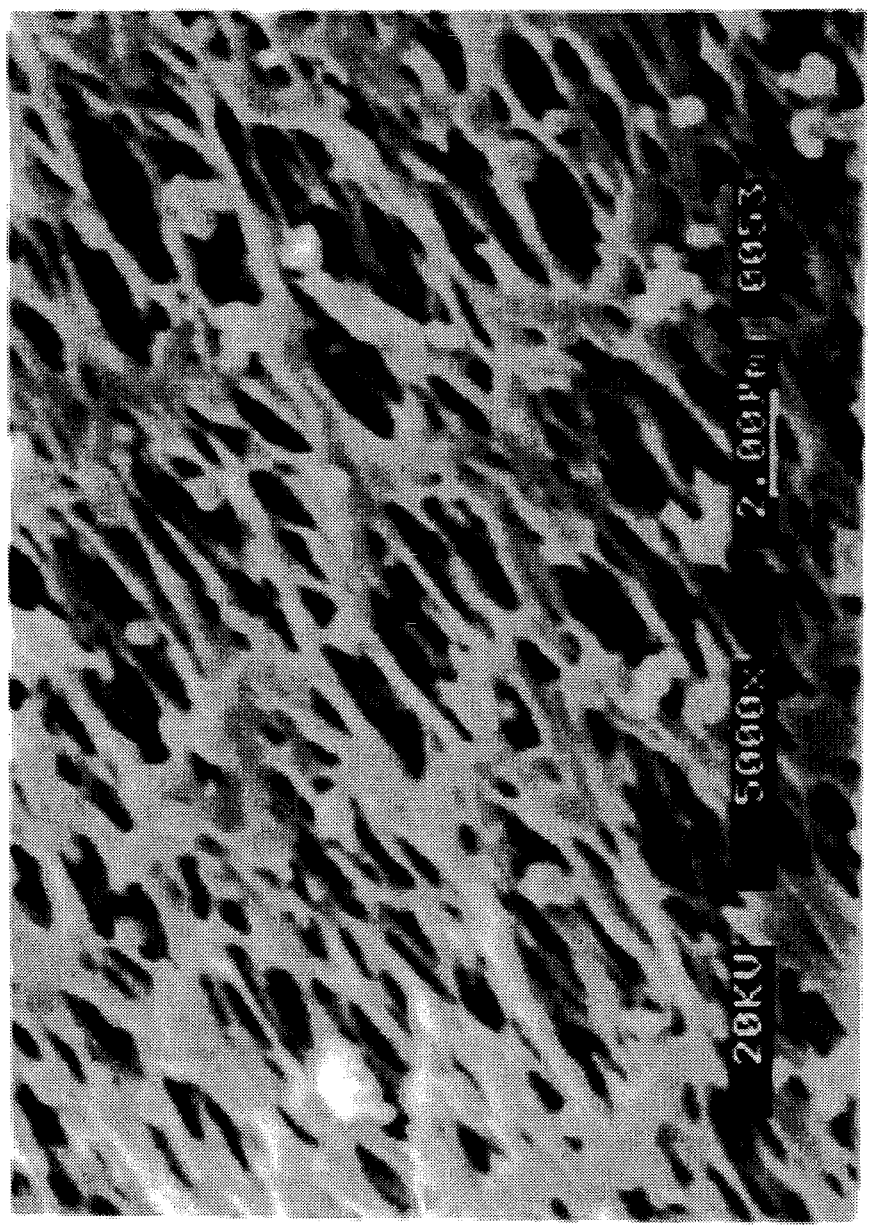
FIG. 2 is an electron microphotograph of the outer surface of the hollow fiber obtained in Example 1.

Electron microphotographs of the inner surface and the outer surface of the obtained hollow fiber are shown in FIG. 1 (1,000 magnifications) and FIG. 2 (5,000 magnifications), respectively.

As seen in FIG. 1, a large number of approximately circular openings having a minor axial length of 5 to 7 µm are distributed in the inner surface in proximity to each other at intervals of 2 to 5 µm. The surface fraction of openings in the inner surface was about 70%.

On the other hand, as seen in FIG. 2, fibrils having a thickness of 0.2 to 0.5 µm and a length of 2 to 3 µm are formed in the outer surface. They are arranged in the fiber axial direction at intervals of 0.2 to 1.2 µm. Also, the both ends of fibrils are connected to fine and porous lamella-like regions having fine openings, which are considered to be in a state prior to fibrillation. The fraction of the area of the fibril region except the lamella-like region was abut 80%. The surface fraction of openings in the outer surface was about 70%.

The section of the obtained hollow fiber had a network structure where the pore size almost continuously increased from the outer surface toward the inner surface.

The hollow fiber had a maximum tensile strength of 62 kg/cm² and a maximum elongation of 55%. Also, the permeation velocity of water passed from the inner surface side was 11,000 liters/m².hr.kg/cm², and the permeation velocity of water passed from the outer surface side was 13,000 liters/m²hr.kg/cm².

EXAMPLE 2

In a mixed solvent of 67.5 parts of N-methyl-1-2-pyrrolidone and 11.5 parts of propylene glycol were dissolved 5 parts of polyethylene glycol having a number average molecular weight of 300,000 and 16 parts of polysulfone (Udel Polysulfone P-3500). The thus prepared spinning solution had a lower critical solubility temperature of 60° C. and a viscosity of 8,400 cps at 60° C.

A mixture of 70 parts of N-methyl-2-pyrrolidone and 30 parts of propylene glycol was used as the core liquid.

A double ring nozzle having a ring-like discharge port with an inner diameter of 0.5 mm and an outer diameter of 0.8 mm and a core liquid discharge port with a diameter of 0.3 mm was used. The spinning solution maintained at 60° C. was extruded through the ring-like discharge port at a rate of 6.2 g/minute, while extruding the core liquid through the inside discharge port at a rate of 2.4 g/minute. The extruded spinning solution was introduced into 60° C. hot water located below the nozzle at a distance of 15 cm to coagulate the spinning solution, and was wound up at a spinning velocity of 50 m/minute to give a hollow fiber having an inner diameter of 270 µm and an outer diameter of 450 µm. The spinning solution extruded from the nozzle expanded to a thickness of about 2 mm just below the nozzle, thus the draw ratio was about 4.5.

Figure 3:
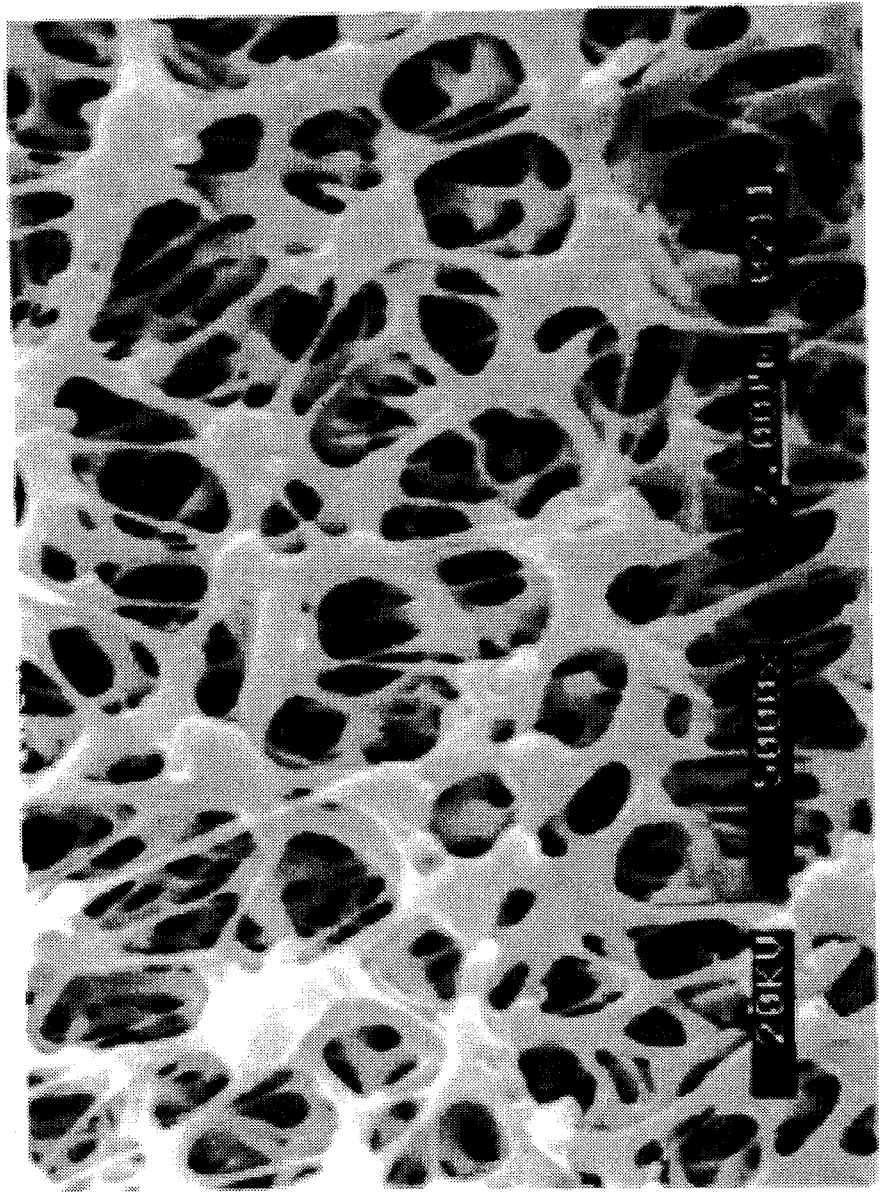
FIG. 3 is an electron microphotograph of the inner surface of a hollow fiber obtained in Example 2 described after.
Figure 4:
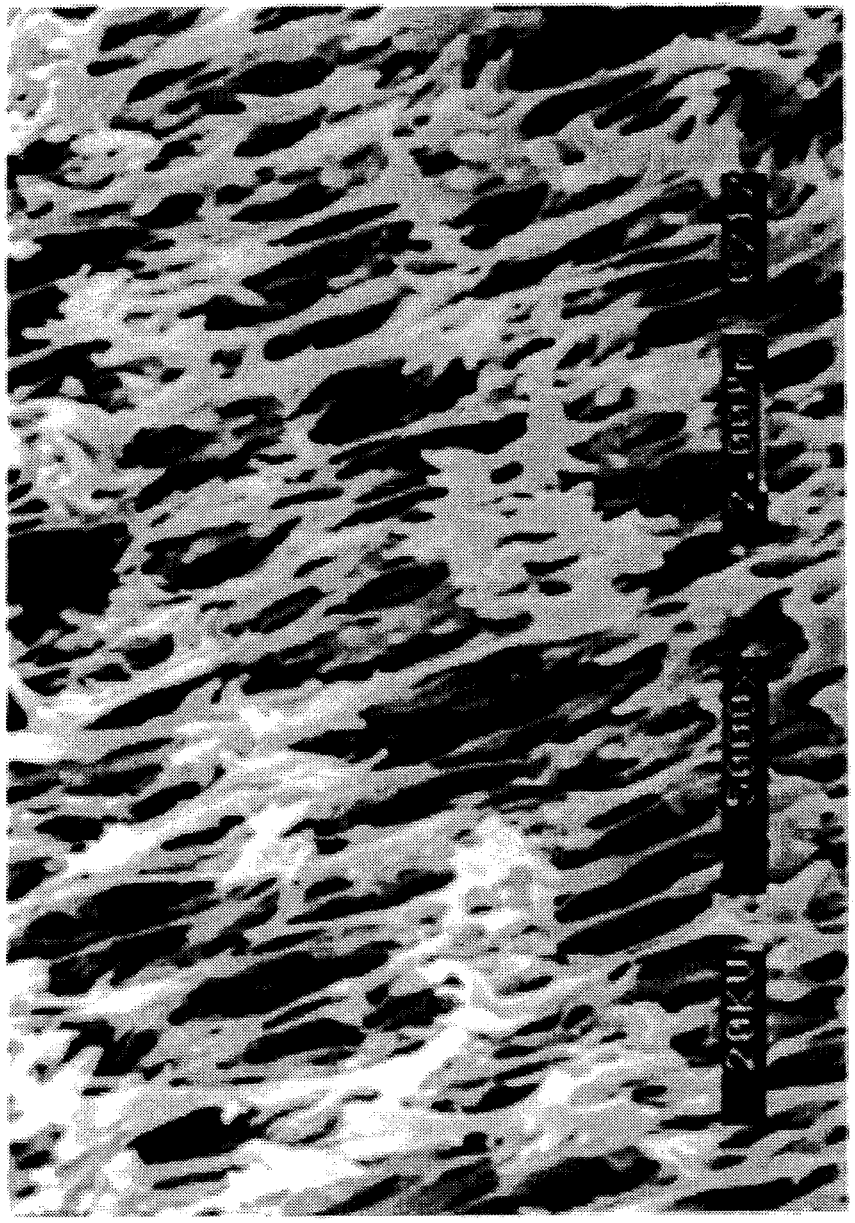
FIG. 4 is an electron microphotograph of the outer surface of the hollow fiber obtained in Example 2.

Electron microphotographs of the inner surface and the outer surface of the obtained hollow fiber are shown in FIG. 3 (5,000 magnifications) and FIG. 4 (5,000 magnifications), respectively.

As seen in FIG. 3, the inner surface had a network structure composed of a framework having a thickness of 0.5 to 1 µm and a length of 1 to 5 µm where a large number of openings having a minor axial length of 0.5 to 3 µm are formed, and the surface fraction of openings was about 90%.

On the other hand, as seen in FIG. 4, fibrils having a thickness of 0.1 to 0.5 µm and a length of 2 to 4 µm are formed and arranged in the almost entire outer surface through fine lamella-like regions in the fiber axial direction at intervals of 0.2 to 2 µm. The fraction of the area of the fibril region was about 90%. The surface fraction of openings in the outer surface was about 90%.

The section of the hollow fiber had a network structure where pores having approximately uniform size as a whole were present though the pore size in the vicinity of the inner and outer surfaces were slightly larger.

The hollow fiber had a tensile strength of 59 kg/cm² and a maximum elongation of 90%. The permeation velocity of water passed from the inner surface side of the hollow fiber was 14,000 liters/m².hr.kg/cm², and the permeation velocity of water passed from the outer surface side was 17,000 liters/m².hr.kg/cm².

EXAMPLE 3 AND COMPARATIVE EXAMPLES 1 to 4

A module whose effective total outer surface area of hollow fibers was 1,900 cm² was prepared using the hollow fiber obtained in Example 2. With respect to turbidity filtration ability (according to Water Purifier Test Standards, item 8.4.2 provided that the ability is represented by total amount of water filtered until the filtration rate of the dispersion of kaolin powder in water reaches 1.3 liters/minute.kg/cm²), this module was compared with hollow fiber filters having approximately the same effective area of household water purifiers commercially available from companies A, B, C and D.

The turbidity filtration abilities were 1,600 using fiber of the liters for the filter the hollow present invention, 660 liters for company A filter, 700 liters for company B filter, 570 liters for company C filter and 530 liters for company D filter. In the filtration of Kobe city water, these filters showed filtration abilities roughly proportional to the above values. These results show that the filter using the hollow fiber of the present invention is hard to cause clogging and is extremely superior in the life of use. The hollow fibers used in the filters of companies A to D have circular openings or irregular shape openings in their outer surfaces, and the surface fraction of openings in the outer surface of these fibers was from about 20 to 40%.

EXAMPLE 4

In a mixed solvent of 68 parts of N-methyl-2-pyrrolidone and 11 parts of propylene glycol were dissolved 5 parts of polyethylene glycol having a number average molecular weight of 300,000 and 16 parts of polysulfone (Udel Polysulfone P-3500). The thus prepared spinning solution had a lower critical solubility temperature of 65° C. and a viscosity of 8,200 cps at 60° C.

A hollow fiber was prepared in the same manner as in Example 2 by extruding the thus prepared spinning solution maintained at 60° C. except that the discharge rates of the spinning solution and the core liquid were set 6.1 g/minute and 4.1 g/minute, respectively. The obtained hollow fiber had an inner diameter of 310 µm and an outer diameter of 440 µm, and had almost the same inner, outer and sectional structures as those of the hollow fiber obtained in Example 2.

A module having an effective length of 17 cm was prepared by bundling 240 hollow fibers. Fresh bovine blood maintained at 36° C. was filtered by passing through the inner hollow portion of the hollow fiber at a rate of 5 ml/minute. Even if the filtration velocity and filtration pressure reached 2.5 ml/minute and 250 mmHg, no hemolysis was observed.

COMPARATIVE EXAMPLES 5

In a mixed solvent of 61.5 parts of N-methyl-2-pyrrolidone and 25.5 parts of propylene glycol was dissolved 13.0 parts of polysulfone (Udel Polysulfone P-3500). The thus prepared spinning solution had a upper critical solubility temperature of 70° C. and a viscosity of 150 cps at 85° C.

A 70% aqueous solution of N-methyl-2-pyrrolidone was used as the core liquid.

A double ring nozzle having an inner diameter of 400 µm, an outer diameter of 600 µm and a core liquid discharge port diameter of 250 µm was used. The spinning solution maintained at 85° C. was extruded through the nozzle at a rate of 6.5 g/minute, while extruding the core liquid at a rate of 4.5 g/minute. The extruded spinning solution was introduced into 60° C. hot water located below the nozzle at a distance of 15 cm to coagulate the spinning solution, and was wound up at a spinning velocity of 50 m/minute to give a hollow fiber having an inner diameter of 340 µm and an outer diameter of 440 µm. The diameter of the spinning solution being extruded from the nozzle became smaller than the outer diameter of the nozzle at just below the nozzle, and expansion as observed in the preparation of the hollow fiber of the present invention was not observed.

In the inner surface of the obtained hollow fiber were present openings of irregular shape having a diameter in inscribed circle of 0.1 to 4 µm, and the surface fraction of openings was about 20%. In the outer surface of the hollow fiber were present approximately circular openings having a diameter of 0.1 to 1.2 µm, and the surface fraction of openings was about 20%. The section of the hollow fiber had an almost uniform network. The permeation velocity of water passed from the inner surface side of the hollow fiber was 20,000 liters/$m^2 \cdot hr \cdot kg/cm^2$.

The filtration test of bovine blood was carried out in the same manner as in Example 4 by using the hollow fiber obtained above. The filtrate was tinged with red, namely hemolysis was observed, when the filtration S velocity and filtration pressure reached 1.9 ml/minute and 80 mmHg.

From the test results in the above Examples and Comparative Examples, it would be understood that the hollow fiber of the present invention is remarkably superior in the life with respect to clogging.

In addition to the ingredients used in the Examples, other ingredients can be used in the Examples as set forth in the specification to obtain substantially the same result.

What is claimed is:

1. A porous hollow fiber of polysulfone comprising an outer surface having a structure which is in a state of a high degree of fibrillation and which comprises fibrils each having a thickness of 0.1 to 0.5 µm and each having porous lamella-like regions at both ends.

2. The hollow fiber of claim 1, wherein said outer surface has a surface fraction of openings of at least 50%.

\* \* \* \* \*